(12) United States Patent
Murano et al.

(10) Patent No.: US 7,439,453 B2
(45) Date of Patent: Oct. 21, 2008

(54) HINGE SYSTEM FOR LOW-PROFILE CABINET ASSEMBLIES

(75) Inventors: Adam Murano, Lebanon, CT (US); Chester H. Rynaski, Franklin, CT (US)

(73) Assignee: Ortronics, Inc., New London, CT (US)

( * ) Notice: Subject to any disclaimer, the term of this patent is extended or adjusted under 35 U.S.C. 154(b) by 280 days.

(21) Appl. No.: 11/430,764

(22) Filed: May 9, 2006

(65) Prior Publication Data

US 2007/0274645 A1 Nov. 29, 2007

(51) Int. Cl.
*H02G 3/08* (2006.01)
(52) U.S. Cl. ............................ 174/543; 174/50; 174/58; 200/61.81; 292/201
(58) Field of Classification Search .................... 174/50, 174/60, 58; 439/535; 220/4.02; 200/61.81; 292/144, 201
See application file for complete search history.

(56) References Cited

U.S. PATENT DOCUMENTS

| | | | |
|---|---|---|---|
| 4,091,501 A | 5/1978 | Lautenschlager et al. | |
| 4,729,612 A | 3/1988 | Stone | |
| 4,915,460 A | 4/1990 | Nook et al. | |
| 4,979,265 A | 12/1990 | Grass | |
| 5,249,855 A | 10/1993 | Franklin et al. | |
| 5,535,482 A | 7/1996 | Grabber | |
| 5,540,339 A | 7/1996 | Lerman | |
| 6,060,660 A * | 5/2000 | Bauer | 174/60 |
| 6,493,906 B2 | 12/2002 | Matteau | |
| 6,708,834 B2 * | 3/2004 | Hagerman, III | 220/4.02 |
| 7,294,017 B2 * | 11/2007 | Scott | 439/535 |
| 7,323,637 B2 * | 1/2008 | Tideback | 174/50 |
| 7,355,115 B2 * | 4/2008 | Liang | 174/50 |

\* cited by examiner

*Primary Examiner*—Dhiru R Patel
(74) *Attorney, Agent, or Firm*—McCarter & English, LLP

(57) ABSTRACT

Hinge mechanisms that facilitates access to internal components associated with a cabinet, e.g., a fiber optic cabinet, are provided. The hinge mechanisms are adapted for use with a telecommunication cabinet that is of low profile design, e.g., 1U or 2U height. The hinge mechanisms accommodate a combination of motions, e.g., a sliding motion and a hinging motion, whereby the limited space associated with a low profile cabinet is overcome and access to internal componentry, e.g., patch panels, is facilitated. A pair of hinge mechanisms are provided with a door. The hinge mechanisms mount outward of the cabinet so as to permit the door to be pivoted downward without engagement between with another cabinet or other structure positioned therebelow. A U-shaped member may be mounted to the door and sliding pins to translate motion from the hinge mechanisms to the door.

20 Claims, 4 Drawing Sheets

HINGE SYSTEM FOR LOW-PROFILE CABINET ASSEMBLIES

BACKGROUND

1. Technical Field

The present disclosure is directed to advantageous hinge systems and, more particularly, to hinge systems having particular utility in telecommunication cabinet applications, e.g., low profile cabinet assemblies.

2. Background Art

As the world's telecommunication speeds have increased, the speed of Local Area Networks and other facility-based networks have increased as well. Large data centers and storage area networks have become commonplace, particularly in new facility construction. In many instances, installations that are intended to support super fast transmission of data are no longer being designed and/or implemented with relatively low bandwidth copper cabling. Rather, installations are increasingly incorporating fiber optic transmission systems, at least in part to provide backbone support/infrastructure for new and upgraded installations.

In typical fiber optic structured cabling systems, fiber optic patching typically occurs in an enclosure, e.g., a cabinet. Conventional enclosures/cabinets are generally box-like in shape and include mounting brackets that facilitate mounting with respect to a telecommunication rack, e.g., a 19 inch telecommunication rack. The cabinet also generally includes front and rear doors that are hingedly attached with respect to the cabinet. The rear door is typically hingedly attached to the side or bottom of the cabinet. The front door is generally hingedly attached with respect to the bottom of the cabinet and swings downward. Of note, in typical fiber optic cabinet designs, the hinge mechanisms associated with the front door may not be positioned at the sides of the cabinet, thereby accommodating fiber cables that are mounted with respect to the internal patch panel and exit the enclosure from the sides thereof, i.e., behind the front door.

Cabinet heights are typically quantified in terms of rack units, e.g., 1U, 2U, 3U, etc. A rack unit is generally 1.75 inches in height, and cabinets typically extend up to eight (8) units in height. In the case of a 1U design, i.e., a low profile cabinet, there is typically limited space to include a hinge and accommodate the installation of patch panels and/or MPO (multi-fiber push-on) cassettes. For this reason, 1U cabinets typically have removable doors as opposed to hinged doors. However, the absence of a hinged door is an undesirable configuration because, inter alia, the front door becomes difficult to securely lock and removal is required each time patch cord installation and/or moves, adds or changes are required.

Various hinge designs are disclosed in the patent literature. Exemplary hinge-related disclosures are provided in U.S. Pat. No. 4,091,501 to Lautenschlager et al.; U.S. Pat. No. 4,979,265 to Grass; U.S. Pat. No. 4,729,612 to Stone; U.S. Pat. No. 5,535,482 to Grabber; and U.S. Pat. No. 6,493,906 to Matteau. In addition, U.S. Pat. No. 4,915,460 to Nook et al. discloses a security system for dispensing racks, e.g., racks for display of cigarette cartons. Commonly assigned U.S. Pat. No. 5,540,339 to Lerman discloses an advantageous rack-based door mounting system. Still further, U.S. Pat. No. 5,249,855 to Franklin et al. discloses a slide/swing security door that includes frame and a door which is mounted to the frame such that the door is pivotally movable toward and away from the cabinet frame and is also vertically slidable. The door is vertically slidable between a first position, in which a series of slits are aligned with corresponding shelves so that product may be dispensed, to a second position, in which the slits are not aligned with the shelves and product is inaccessible.

Despite efforts to date, a need remains for enhanced hinge systems and/or hinge designs that facilitate cabinet access, particularly in connection with low profile cabinetry. A further need remains for door designs for use with low profile cabinets, e.g., fiber optic cabinets, that facilitate access to internal components, e.g., patch panels and the like. Still further, a need remains for fiber optic cabinetry designs that include hingedly mounted front and rear doors, wherein access to internal componentry is facilitated despite a low profile design therefore. These and other needs are satisfied by the disclosed hinge systems/hinge designs and associated door/cabinet assemblies and sub-assemblies, as will be apparent to persons skilled in the art from the description which follows.

SUMMARY

The present disclosure provides an advantageous hinge mechanism/hinge design that facilitates access to internal components associated with a cabinet, e.g., a fiber optic cabinet. In particular, the disclosed hinge mechanism/hinge design is adapted for use with a telecommunication cabinet that is of low profile design, e.g., 1U or 2U height. According to exemplary embodiments of the present disclosure, the hinge mechanism is adapted for a combination of motions, e.g., a sliding motion and a hinging motion, whereby the limited space associated with a low profile cabinet is overcome and advantageous access to internal componentry, e.g., patch panels and the like, is facilitated.

A pair of hinge mechanisms are generally provided with each door or face plate to be mounted with respect to an enclosure/cabinet—one hinge mechanism at either side of the door/face plate. Each disclosed hinge mechanism typically mounts outboard of the cabinet or enclosure, i.e., the hinge mechanism mounts with respect to the outer surfaces of opposed side walls associated with the cabinet/enclosure. The disclosed hinge systems/hinge designs generally include an elongated slot that cooperates with pin members that are adapted for sliding engagement therewith.

The hinge mechanisms are sized and positioned such that downward movement of the door may be accomplished without engaging a structure positioned therebelow, e.g., a cabinet or switch positioned therebelow in a telecommunications rack. The pin members associated with the hinge mechanisms may be mounted with respect to a U-shaped member that is, in turn, mounted to the door. A variety of materials may be used in fabricating the relevant components, including metals, plastics and combinations thereof.

Additional features, functions and benefits associated with the disclosed hinge mechanisms and related assemblies will be apparent from the description which follows, particularly when read in conjunction with the appended figures.

BRIEF DESCRIPTION OF THE FIGURES

To assist those of ordinary skill in the art in making and using the disclosed systems, reference is made to the accompanying figures, wherein.

DESCRIPTION OF EXEMPLARY EMBODIMENT(S)

Figure 1:
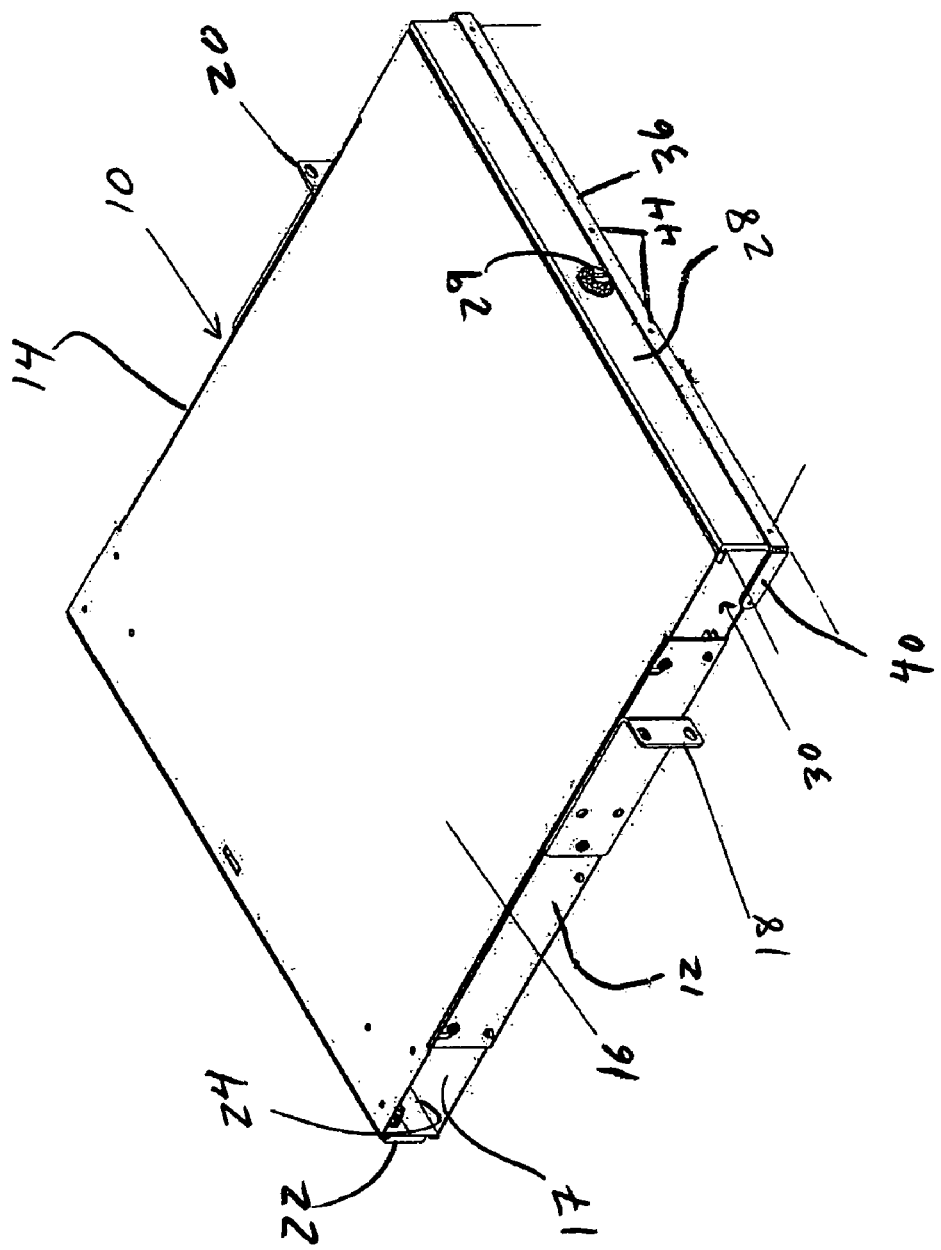
FIG. 1 is a front plan view of an exemplary cabinet in which the front door is in a closed position.

Advantageous hinge mechanisms and hinge designs are provided according to the present disclosure. Although the disclosed hinge mechanisms and hinge designs are particularly beneficial in applications where the associated enclosure is of low profile design, the disclosed hinge mechanisms/hinge designs are susceptible to wide ranging applications. The disclosed hinge systems and hinge designs generally facilitate access to internal components associated with an enclosure, e.g., a fiber optic cabinet. In particular applications, the disclosed hinge mechanisms and/or hinge designs may be used with a telecommunication cabinet that is of low profile design, e.g., 1U or 2U height. According to exemplary embodiments of the present disclosure, the hinge mechanism is adapted for a combination of motions, e.g., a sliding motion and a hinging motion, whereby issues associated with a low profile enclosure/cabinet are advantageously overcome and ready access to internal componentry, e.g., patch panels and the like, is facilitated.

Generally, the disclosed hinge mechanisms are provided in pairs, such that a first hinge mechanism is mounted at a first side or end of an enclosure/cabinet and a second hinge mechanism is mounted at a second side or end of an enclosure/cabinet. The disclosed hinge mechanisms typically facilitate movement of a door or face plate with respect to an enclosure, such as a telecommunication cabinet. Each disclosed hinge mechanism typically mounts outboard of the enclosure/cabinet, i.e., the hinge mechanism mounts with respect to the outer surfaces of opposed side walls associated with the cabinet/enclosure, to facilitate movement of the door/face plate relative to the enclosure/cabinet. Exemplary design features and geometries are described in greater detail with reference to the appended figures.

Thus, with reference to FIGS. 1-4, an exemplary cabinet 10 is depicted. In the disclosed embodiment, the geometry of cabinet 10 is substantially box-like and the dimensions of cabinet 10 are such that a low profile design is defined—in this case, the height of cabinet 10 corresponds to a single rack unit (1.75 inches). Cabinet 10 is defined by first side wall 12 and an opposed, second side wall 14, top face 16 and a bottom face 17. First and second L-shaped flanges 18, 20 are mounted to side walls 12, 14, respectively, to facilitate mounting of exemplary cabinet 10 to a telecommunications rack or similar structure. Thus, according to exemplary embodiments of the present disclosure, cabinet 10 is sized and dimensioned to be mounted to a conventional 19" telecommunications rack, with the outwardly projecting portions of flanges 18, 20 mounted to cooperating panels/faces of the telecommunications rack, as is known in the art.

A rear door 22 is generally mounted with respect to cabinet 10. Rear door 22 is typically pivotally mounted with respect to the bottom face 16 in a conventional manner. With particular reference to FIG. 1, a gap 24 is defined between rear door 22 and side wall 12 to facilitate passage of cords/cables, e.g., fiberoptic cables. A similar gap is generally defined on the opposite side of cabinet 10 for the passage of cables and the like. The size of gap 24 (and the corresponding gap on the opposite side of cabinet 10) is generally defined by the length of side wall 12 (and side wall 14, respectively), and is selected so as to accommodate an expected volume of cords and/or cables to be accommodated therewithin.

Turning to the front portion of cabinet 10, a pair of advantageous hinge mechanisms 26, 27 are provided in association with front door 28 according to the present disclosure. With initial reference to FIG. 1, front door 28 is shown in a closed orientation, such that the components positioned within cabinet 10 (e.g., a fiberoptic patch panel) are enclosed therewithin. However, as most clearly shown in FIG. 2, a first gap 30 is defined between side wall 12 and front door 28, and a second gap 32 is defined between side wall 14 and front door 28 opposite thereto. As with gap 17 (and the counterpart gap thereto), gaps 30, 32 facilitate the passage of cords/cables into and out of cabinet 10, particularly with front door 28 in its closed orientation. The size of gaps 30, 32 is generally defined by the length of side walls 12, 14, as noted above with respect to gap 17. An exemplary handle/knob 29, which typically includes locking functionality, is positioned on front door 28. The design and operation of locking handle/knob 29 is conventional, as will be readily apparent to persons skilled in the art.

Hinge mechanisms 26, 27 are substantially identical, except that in certain respects they are mirror images of each other. For purposes of the present description, attention will be directed to hinge mechanism 26. However, it is to be understood that the present description applies with equal force to hinge mechanism 27. Hinge mechanism 26 generally includes an elongated slot 34 that is oriented along the axis of side wall 12. According to exemplary embodiments of the present disclosure, elongated slot 34 is defined within an upwardly extending plate-like member 35 that is formed by rolling or bending material associated with bottom face 17 upward. Either before or after rolling/bending such material upward relative to bottom face 17, elongated slot or track 34 is defined therewithin.

Hinge mechanism 26 includes a pin 38 that rides within slot 34. Pin 38 cooperates with an extension member 40 that is positioned outwardly relative to plate-like member 35. In an exemplary embodiment of the present disclosure, pin 38 is mounted (or integrally formed) in a rearward region of extension member 40, such that extension member 40 extends forwardly relatively to pin 38. Extension member 40 is mounted relative to front door 28 such that movement of pin 38 within slot 34, and corresponding motion of extension member 40, is translated to movement of front door 28. Thus, in a preferred embodiment of the present disclosure, extension member 40 is part of a U-shaped structure that defines, in part, a horizontal bar 36 that extends across the face of front door 28. The remaining portion of the U-shaped structure is an further extension member (opposite extension member 40) that functions as part of hinge mechanism 27. Horizontal bar 36 is generally designed/fabricated such that it extends a distance that is slightly greater than the width of front door 28, as discussed in greater detail below. As shown in FIG. 1, fasteners, spot welds or other mounting means 44 may be employed to join horizontal bar 36 to front door 28.

According to exemplary embodiments of the present disclosure, one or more washers and/or spacers are positioned between pin 38 and slot 34. Exemplary washers are fabricated from a plastic, Teflon™, or similar material, to assist in smooth movement and/or reduced friction between interacting components. In addition, a Tinnerman self-gripping clip or similar structure may be used to prevent pin 38 from being pried or otherwise becoming disengaged from slot 34.

Figure 2:
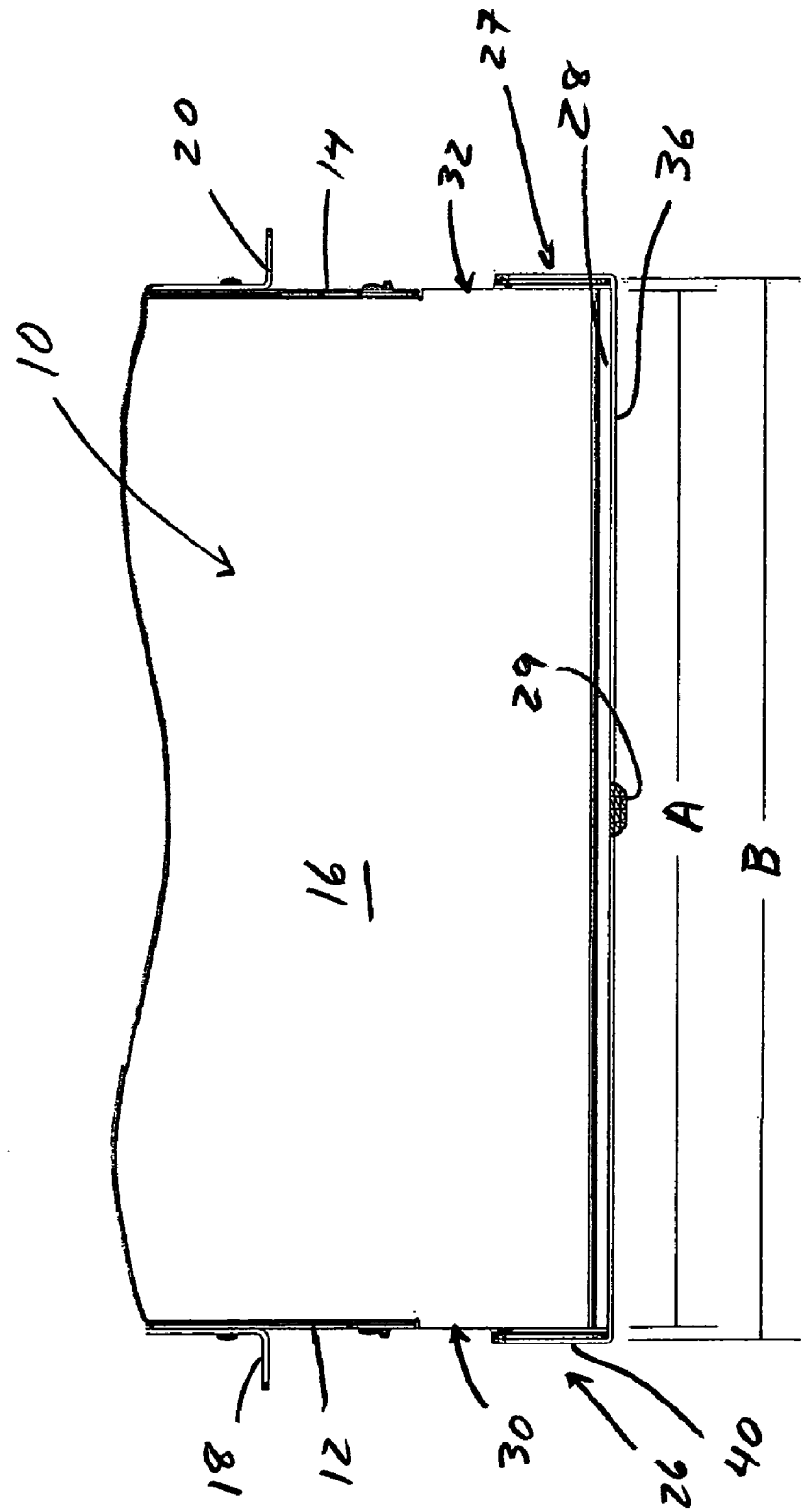
FIG. 2 is a top view of the front portion of the exemplary cabinet depicted in FIG. 1 hereto.

With reference to the top view of FIG. 2, certain aspects of the dimensional relationship of the components of exemplary cabinet 10 are depicted. Thus, the width of cabinet 10 (and, by extension, the width of front door 28) is indicated by reference designation "A". By contrast, the width of horizontal bar 36 is indicated by reference designation "B". The difference between dimensions "A" and "B" represents the clearance provided to accommodate plate-like member 35 and the counterpart plate-like member associated with hinge mechanism 27. This advantageous spatial orientation not only accommodates the passage of cords/cables through gaps 30, 32, but by forming plate-like member 35 at the periphery of bottom face 17 and positioning extension member 40 outward thereof, i.e., beyond a standard cabinet width "A", the disclosed hinge mechanisms 26, 27 advantageously accommodate repositioning of a front door 28 despite the potential presence of a similar cabinet, switch or other structure below cabinet 10.

As will be apparent to persons skilled in the art, if the extension member 40 (and its counterpart) were not positioned outward of the cabinet footprint, efforts to pivot the front door 28 downward would be ineffective because the extension members would collide with the cabinet, switch or other structure below cabinet 10 as the front door 28 was articulated and then rotated open. Similarly, if the horizontal bar 36 were attached outboard of the cabinet footprint on the exact plane with the exterior of cabinet 10, the tolerances inherent in the positioning of the cabinet in an EIA pattern with a cabinet, switch or other structure below would cause similarly unacceptable interference.

Figure 4:
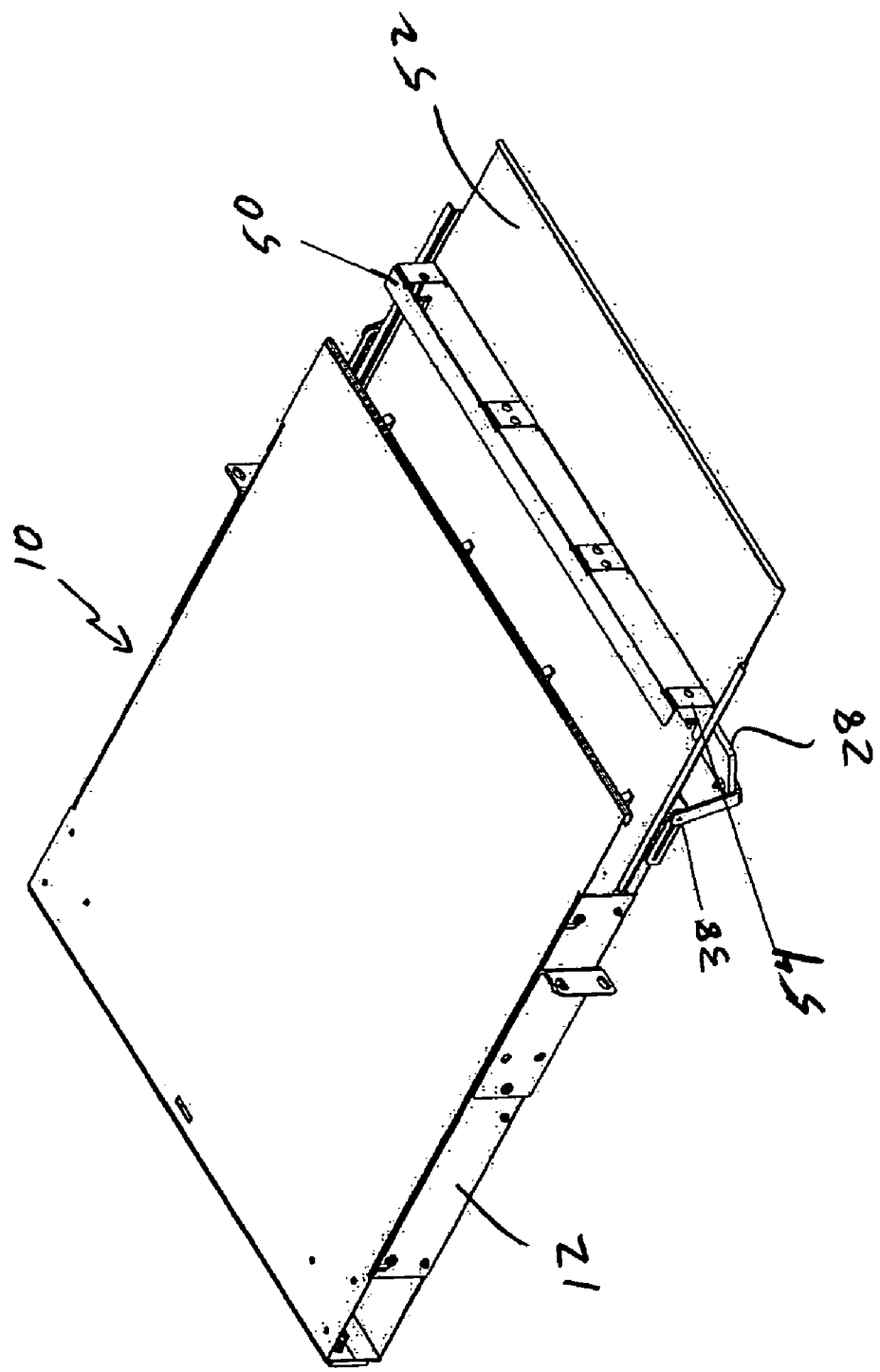
FIG. 4 is a further front plan view of the exemplary cabinet depicted in the preceding figures, with a shelf/patch panel slid outward from the cabinet.

Thus, according to exemplary embodiments of the present disclosure, the hinge mechanisms 26, 27 must be effective to permit/facilitate motion of the front door such that it is both hinged and translatable in the manner described herein, otherwise the front door will not swivel sufficiently to provide clearance for accessing/interacting with internal components, e.g., patching with respect to a patch panel 50 (as schematically depicted in FIG. 4) when front door 28 is open and internal shelf 52 is slid outward from the enclosure defined by cabinet 10 to provide access to connectors 54.

In one embodiment of the disclosed design, operative aspects of hinge mechanisms 26, 27 are positioned outward of the cabinet width and the minimum width "B" is defined by the sum of: (i) the width of the largest cabinet, switch or other structure that may be installed below the relevant cabinet/enclosure, plus (ii) the maximum side-to-side positional movement allowed by the EIA pattern, plus (iii) the maximum positional movement that the cabinet itself can realize.

From a materials standpoint, various metallic and non-metallic materials may be used to fabricate the various components disclosed herein. Thus, for example, the front door 28 may be fabricated in its entirety from an appropriate metal, or fabricated in its entirety from an appropriate plastic, or a composite thereof. In an exemplary embodiment of the present disclosure, a cabinet that includes the advantageous hinge mechanisms disclosed herein includes a metal horizontal bar 36, metal pins 38, metal top, bottom of side faces, and a clear polycarbonate front door 28 mounted with respect to the horizontal bar via fasteners 44. Each of the metal pins 38 engage a slot to define/form the disclosed hinge mechanism. Of note, the slots could be fabricated as pockets in plastic. To provide smooth articulation of the front door during opening and closing operations, a plastic washer is inserted between plate-like member 35 and extension member 40. As noted above, metal self-gripping clip and/or a Tinnerman or C-clip may be employed to better retain the hinge pin relative to the slots.

Figure 3:
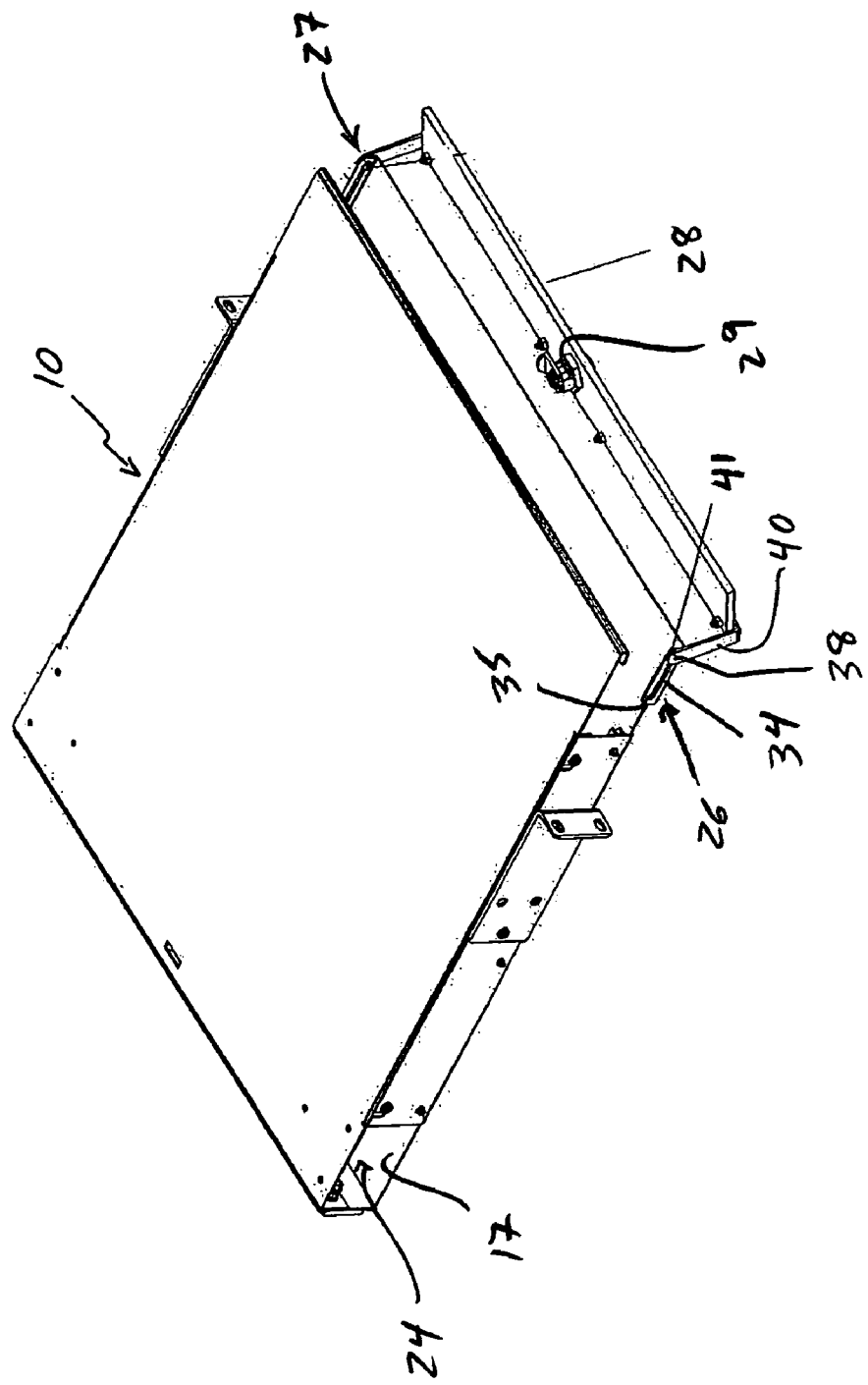
FIG. 3 is a front plan view of the exemplary cabinet of FIG. 1, with the door in an open and downwardly pivoted orientation.

In use and with reference to FIGS. 1, 3 and 4, a system user is allowed to access components within cabinet 10 by sliding and pivoting front door 28 relative to plate-like member 35 (and its counterpart). As shown in FIG. 3, pin 38 is adapted to travel linearly within slot 34, such that front door 28 moves outwardly from its initial closed position of FIG. 1. In addition, door 28 is able to pivot downward and out of the path of shelf 52, as shown in FIGS. 3 and 4. Of note, through the proper dimensioning of hinge mechanisms 26, 27, particularly with regard to dimension "B", the front door is able to pivot downward so as to accommodate outward movement of shelf 52, even if a further cabinet, switch or other structure is positioned below cabinet 10. Thus, as shown in FIG. 4, the system user is able to access componentry otherwise positioned within cabinet 10, e.g., for patching activities and the like. Thus, the disclosed hinge mechanisms offer numerous commercial advantages, including facilitating both rotation and translation of a door as it is being opened and closed. Implementation of the moving aspects of the disclosed hinge mechanisms outboard of the cabinet/enclosure width allows the door to pass neatly over the box or switch located below. In addition, positional tolerances of the cabinet, switch or cabinet positioned below the disclosed assembly may be advantageously compensated for in the design, as described herein.

Although the present disclosure has been described with reference to exemplary embodiments, the present disclosure is not limited by such exemplary embodiments. Rather, the disclosed embodiments and implementations are merely illustrative of the disclosed designs, mechanisms and assemblies. Alternative and/or enhanced embodiments of the disclosed designs, mechanisms and assemblies may be pursued without departing from the spirit or scope of the present disclosure, and such alternatives/enhancements are expressly encompassed within the scope of the present disclosure.

The invention claimed is:

1. An enclosure including at least one door, comprising:
    a. a bottom face that cooperates with first and second upwardly extending members at opposed sides of the bottom face, each of the first and second upwardly extending members defining an elongated slot therewithin;
    b. an extension member positioned outward of each of the first and second upwardly extending members, each extension member being mounted with respect to the at least one door; and
    c. a pin positioned for travel within each of the elongated slots, each pin being mounted with respect to a corresponding one of the extension members;
    wherein the extension members are positioned sufficiently outward of the bottom face that the at least one door may be pivoted downward without engaging a structure having a predetermined width that is positioned below the bottom face.

2. An enclosure according to claim 1, further comprising first and second side faces mounted with respect to the bottom face, and a top face, wherein the bottom face, side faces and top face define a box-like enclosure.

3. An enclosure according to claim 2, wherein a gap is defined between each of the side faces and the at least one door.

4. An enclosure according to claim 3, wherein each of the gaps is sized to accommodate passage of fibers therethrough.

5. An enclosure according to claim 2, wherein the box-like structure is a telecommunications cabinet.

6. An enclosure according to claim 1, wherein first and second upwardly extending members are integral with the bottom face and are formed by rolling or bending plate-like portions of the bottom face upward.

7. An enclosure according to claim 1, further comprising at least one washer positioned between the pin and the upwardly extending member.

8. An enclosure according to claim 1, further comprising a horizontal bar that cooperates with the extension members and is mounted with respect to the at least one door.

9. An enclosure according to claim 8, wherein the extension members and the horizontal bar define a U-shaped structure.

10. An enclosure according to claim 9, wherein the width of the U-shaped structure corresponds to a dimension that exceeds the predetermined width.

11. An enclosure according to claim 1, wherein the extension members are spaced from each other by a distance that exceeds the predetermined width.

12. An enclosure according to claim 11, wherein the distance exceeds the predetermined width by an amount that is equal to or greater than a sum of (i) a cabinet width to be positioned below the bottom face, (ii) side-to-side positional movement allowed by an applicable EIA pattern for the cabinet to be positioned below and (iii) movement realizable by the bottom face.

13. A telecommunications cabinet, comprising:
   a. a bottom face, a pair of side walls and a top face that define an enclosure;
   b. a first upwardly extending member joined to the bottom face in a substantially perpendicular orientation on a first side of the bottom face;
   c. a first elongated slot formed in the first upwardly extending member;
   d. a second upwardly extending member joined to the bottom face in a substantially perpendicular orientation on a second side of the bottom face opposite the first side;
   e. a second slot formed in the second upwardly extending member;
   f. a first pin positioned within the first elongated slot and adapted for travel therewithin;
   g. a second pin positioned in the second elongated slot and adapted for travel therewithin;
   h. a U-shaped member to which the first and second pins are mounted; and
   i. a door mounted with respect to the U-shaped member; wherein the U-shaped member is sized to permit the door to pivot downward without the U-shaped member engaging a structure positioned below the enclosure.

14. A telecommunications cabinet according to claim 13, further comprising a pair of flanges for mounting the enclosure with respect to a rack.

15. A telecommunications cabinet according to claim 13, wherein gaps are formed between the side walls and the door for passage of cables.

16. A telecommunications cabinet according to claim 13, wherein the first and second upwardly extending members are formed by rolling a plate-like portion of the bottom face upward.

17. A telecommunications cabinet according to claim 13, wherein the bottom face defines a first width dimension "A" and the U-shaped member defines a second width dimension "B", and wherein "B" is greater than "A".

18. A telecommunications cabinet according to claim 13, wherein the second width dimension "B" is at least equal to a sum of (i) a cabinet width to be positioned below the bottom face, (ii) side-to-side positional movement allowed by an applicable EIA pattern for the cabinet to be positioned below, and (iii) movement realizable by the bottom face of the enclosure.

19. A telecommunications cabinet according to claim 13, further comprising a slidable shelf positioned within the enclosure.

20. A telecommunications cabinet according to claim 19, further comprising at least one electronic component positioned on the slidable shelf.

* * * * *